United States Patent [19]

Carasso et al.

[11] 4,292,655
[45] Sep. 29, 1981

[54] SYSTEM INCORPORATING WORD SYNCHRONIZATION FOR A SERIAL SIGNAL SEQUENCE

[75] Inventors: Marino G. Carasso; Johannes J. Verboom, both of Eindhoven, Netherlands

[73] Assignee: U.S. Philips Corporation, New York, N.Y.

[21] Appl. No.: 88,735

[22] Filed: Oct. 26, 1979

[30] Foreign Application Priority Data

Nov. 6, 1978 [NL] Netherlands ............ 7811004

[51] Int. Cl.³ .............................................. G11B 5/09
[52] U.S. Cl. .................................................. 360/40
[58] Field of Search ................ 455/51; 360/51, 39, 360/40, 53; 371/39, 40

[56] References Cited

U.S. PATENT DOCUMENTS 4,001,693  1/1977  Stackhouse et al. ............... 455/51

*Primary Examiner*—Vincent P. Canney
*Attorney, Agent, or Firm*—Thomas A. Briody; Robert T. Mayer; James J. Cannon, Jr.

[57] ABSTRACT

A system having a medium which presents signal sequences which at least partly consist of binary signal sequences and a device for generating a synchronization signal for synchronizing at least parts of said signal sequence (blocks, words). A binary signal sequence contains a synchronization pattern which consists of $(2N+1)$ groups of codes of $m+n$ bits. A number of $(N+1)$ groups have a code content which exhibits a given, at least minimum Hamming distance with respect to the code (codes) of the other group (groups). The device includes a majority decision device which produces the synchronization signal by means of the n bit codes of said $(2N+1)$ groups on the basis of a majority decision ($N+1$ out of $2N+1$).

13 Claims, 6 Drawing Figures

SYSTEM INCORPORATING WORD SYNCHRONIZATION FOR A SERIAL SIGNAL SEQUENCE

BACKGROUND OF THE INVENTION

1. Field of the Invention

The invention relates to a system incorporating (a) a medium which presents signal sequences which consist at least partly of binary signal sequences, and (b) a device for generating a synchronization signal for synchronizing at least parts of said signal sequences (words, blocks), where (c) a binary signal sequence contains a synchronization pattern which consists of $(2N+1)$ groups of codes, each with a number of n ($n>2$) bits, a number of (at the most $N+1$) groups having a code content which has at least a given minimum Hamming distance with respect to the code (codes) of the other group (groups).

(d) said device comprising a majority decision device which produces the synchronization signal by means of said codes on the basis of a majority decision ($N+1$ out of $2N+1$).

2. Description of the Prior Art

A system of this kind is known from U.S. Pat. No. 4,001,693. The known system utilizes a synchronization pattern which notably consists of 9 bits, i.e. 3 groups of 3 bits. One bit of each group is applied, possibly after inversion (depending on the selected codes), to the majority decision device (also referred to hereinafter as majority device). In the majority device it is tested whether at least two of the three bits applied thereto have the same value. Subsequently, the same is done for a second bit of each group, and finally for the third bit of each group. If the results of the three decisions taken have the correct value (the total result is compared with a predetermined code), a synchronization signal is generated.

It is to be noted that the expression "given minimum Hamming distance" is a measure of difference between code contents which is based on the known Hamming code theory. A minimum distance implies that at least one bit of a code group differs from the code content of another group.

The described generating of a synchronization signal notably takes place in communication systems as appears from said U.S. patent. There are also other systems where such generating of a synchronization signal is of importance: memory systems where data are written on/in a storage medium and are notably read therefrom. In systems of this kind it is very important to know when given data become available to the users (i.e. further parts of a system). An introductory section (heading) of a signal sequence is followed by the data section, notably in the form of a data block which may be subdivided into data words. In order to enable discrimination of such a block or the words thereof, synchronization by means of the said synchronization signal for "at least parts of said signal sequences" is required.

In view of the importance of proper block/word synchronization, attempts have been made to find solutions to minimize the risk of errors in the generating of such a synchronization signal. Therefore, in the known system the synchronization pattern consists of $2N+1=3$ groups of $n=3$ bits which are examined in the majority device.

A major source of errors is formed by disturbances which extend over a length of a plurality of bits in the media used in the relevant systems. These disturbances are often referred to as "bursts" and may be interference sources in the communication paths and notably local deformations of the storage material in the storage media (in the form of defects, degenerations, etc.). When such a burst occurs at the time or the area of a synchronization pattern, it may be that no synchronization signal is generated or even that a synchronization signal is generated at an incorrect instant. This may have serious consequences, notably in the case where the synchronization signal occurs at an incorrect instant (for example, it may then be that data are written in a location where data are already present which may not be erased).

As long as a burst is small enough, that is to say if its length does not exceed the bit length $n=3$ of the code in a group, and if no error bit is present in any other location in the synchronization pattern of the known system, this synchronization pattern can still cope with the burst. However, if there is a risk that a burst has a bit length $>n$, faults may occur.

SUMMARY OF THE INVENTION

The systems which form the subject of the present application are of a nature such that bursts having a bit length $>n$ are liable to occur. The invention has for its object to indicate how a synchronization signal can be generated with favorable results even in the case of such bursts. In this respect it must notably be ensured that the risk of occurrence of an incorrect synchronization signal before a correct synchronization signal has appeared, and the risk that no synchronization signal at all is generated, are minimized.

In order to achieve these objects, the system in accordance with the invention is characterized in that (e) a number of m ($m>0$) bits is added to the codes of n bits in the $(2N+1)$ groups, the groups having a code length $m+n$ such that there is only an acceptably small risk that a disturbance (burst) occurring or present in the medium extends over a length which exceeds the length of $m+n$ bits, (f) the number (at the most $N+1$) of groups consisting of $m+n$ bits having a code content which has a given at least minimum Hamming distance with respect to the code (codes) of the other group (group), (g) only the n bits of each group still being used for producing the synchronization signal.

The invention is based on the recognition of the fact that said extension of the code to $n+m$ ($m>0$) bits per group itself cannot give rise to unacceptable problems for generating the synchronization signal in the case of bursts having a bit length $\leq n+m$. However, it is of a decisive importance that the extension does not concern an extension of the number of n bits which is optimum for a given system to a larger number of n bits. The m bits are added but are not involved in the decisions taken by the majority device concerning the code groups of n bits. If they were taken into account, notably the risk that a synchronization signal fails to appear would be unacceptable. In that case, an unnecessary large number of the signal sequences or the relevant space in the medium would not be used. The choice of the number n itself is determined by the compromise between on the one hand the risk that no synchronization signal is liable to occur and on the other hand that such a signal occurs, but at an incorrect instant. This aspect will be elaborated hereinafter.

The choice of the number m is determined by the characteristic of the medium of the system. Generally, the risk of occurance of bursts decreases as the length of the bursts increases. m is chosen so that a length of n+m bits per group is reached which is so large that the risk of occurrence of bursts which extend over a length exceeding a bit length of n+m bits is acceptably small.

For completeness' sake, it is to be noted that so-called time-spread coding has since long been used for protection of data against bursts, see Electronics, Jan. 8, 1968, pages 91-92. Therein, the codes of data blocks are spread in time, so that a burst does not affect a complete data block, but causes a disturbance in a number of different data blocks. The error arising can be corrected or at least detected by means of added correction bits. The present invention also involves a kind of time-spread coding: the addition of the m bits causes a shaft in the time of the initially consecutive groups of n bits. However, because the generating of a synchronization signal is concerned, the use of block division which is customary for data blocks is not possible. The solution involving the addition of m bits as described above is unique and of major significance for the field of synchronization signal generating.

When a signal sequence is present in a system in accordance with the present application, it is important that it can be established where in said sequence the section is located where the synchronization signal is to be expected. Normally speaking, this is established by means of a so-called electronic flywheel circuit which utilizes a count down procedure which starts at the preceding synchronization signal and which produces a pulse when a given count is reached, a gate then being opened at the location in the next signal sequence where the next synchronization signal is expected. This procedure notably requires an electronic arrangement which offers adequate accuracy in order to keep the risk that a synchronization signal occurs at an incorrect instant permissibly small.

An embodiment of the system in accordance with the invention which offers a simple and safe solution to this problem is characterized in that there are provided further means for generating a pulse (window) which commences at a given distance from a recognition point of the binary signal sequence and which is maintained for a period of time during which a synchronization signal can arise from the synchronization pattern, the pulse (window) being terminated by the occurrence of the synchronization signal. Thus, each signal sequence becomes more independent and the occurrence of the pulse (window) is no longer dependent of occurrences in a previous signal sequence which may constitute sources of errors. In practice, said recognition point of the binary signal sequence will be detectable as a unique signal ("gap") at the start of the signal sequence.

An embodiment of the device in accordance with the invention in which emphasis is placed on a simple lay-out of the circuit elements required for generating the synchronization signal is characterized in that said codes of n bits which are situated at predetermined locations in the groups of m+n bits are applied, per code of n bits and given bits thereof after inversion, to n inputs of an AND-function unit, the outputs of the (2N+1) AND-function units being connected to inputs of the majority decision device, and the synchronization signal appearing on the output of the majority decision device in response to a majority decision.

A further embodiment of the system in accordance with the invention is characterized in that a group of m+n bits having a given code content alternates with a group of m+n bits which has at least a given minimum Hamming distance with respect to the former group. Thus, in practice it is advantageous that the number of (at the most N+1) groups consisting of m+n bits have the same code content while one or more (N) groups consisting of m+n bits have the same, but inverted code content with respect to the other groups. The largest possible difference is thus realized between adjacent code groups; in other words, the Hamming distance between the code groups is then largest. The risk that an incorrect synchronization signal appears before the appearance of the correct synchronization signal (see above) is thus reduced. It is also advantageous if in (N+1) groups the m bits added to the codes of n bits all have the same (1) value, or if these bits all have the same but the inverted value (0) in the (N) group (groups).

The addition of m bits to codes of n bits in accordance with the present application, of course, means a loss of capacity of the medium used in the system. Therefore, it is advantageous to use the idea of the invention whenever allowed by the capacity of the medium without giving rise to problems. This holds good for storage systems comprising a medium in the form of a record carrier for the storage of the signal sequences. These systems may be magnetic storage systems, capacitive storage systems and notably storage systems of the optical type. An example of the latter type is formed by the digital optical recording system described in the previous Dutch Application No. 7802859 copending U.S. patent application, Ser. No. 140,409, filed April 14, 1980. In this system, the data stored are written/read on/from a record carrier.

With respect to the above storage systems, a record carrier for use as a storage medium in accordance with a further aspect of the invention is characterized in that the storage medium is a disk-shaped storage plate which is divided into sectors and on which the signal sequences are present in the form of tracks, the tracks being divided in sectors and containing an introductory section (heading) per sector which inter alia contains the synchronization pattern. In a practical situation, the synchronization pattern comprises $2N+1=3$ groups of $n=3$ and also $m+n=5+3=8$ bits. In accordance with a further practical aspect of the invention, the bit pattern is as follows: 11111100 ¦ 00000011 ¦ 11111100 (or the inverse thereof); therein, the code groups of $n=3$ bits are: 100, 011, 100 (or the inverse thereof).

The invention will be described in detail hereinafter with reference to some examples. It is to be emphasized, however, that the invention is by no means restricted to these examples.

BRIEF DESCRIPTION OF THE DRAWINGS

The figures serve to illustrate the described examples.

DESCRIPTION OF THE PREFERRED EMBODIMENT

Figure 1:
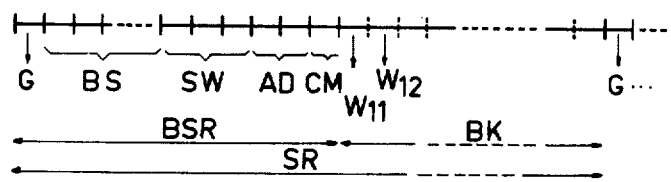
FIG. 1 shows a signal sequence occurring in a system in accordance with the present application.

In FIG. 1 a signal sequence is denoted by the reference SR. Signal sequences of this kind may occur in the field of communication techniques. Data transport is thus realized between a transmission station and a receiving station. In the field of memories, signal squences of this kind occur when serial memories are concerned, notably high-capacity serial memories. These memories may be IC memories of the so-called bucket-brigade type, magnetic tape/magnetic disk memories, and notably optical disk memories having a very high capacity. For an example of a memory of the latter kind, reference has already been made in the preamble to a previously filed Patent Application in the name of Applicant. The signal sequence SR comprises an introductory part ("heading") BSR which is a binary signal sequence. The remainder BK of SR may also be binary, but may also be an analog signal sequence or a combination of both. In this example, BK is shown as a block with a subdivision into words W11, W12, . . . . The set-up of the system in accordance with the invention aims to provide an as accurate and error-free solution as possible in order to obtain synchronization for said signal sequence part BK or the components W11, W12 (words) thereof. In this example, the introductory part BSR consists of: G, BS, SW, AD, CM. The reference G is a recognition point to indicate the start of a signal sequence, i.e. in this case also the introductory part. G is a signal of a unique nature, for example, a character specially reserved for this purpose which can be detected from the signal sequence. BS means bit synchronization. BS may consist of a number of bytes of, for example, binary 1-signals. The system is thus bit synchronized and the clock of the system is thus determined (see GL, FIG. 4). SW means: a synchronization pattern wherefrom the synchronization signal (SS, see FIG. 3) is to be derived which serves for said synchronization of BK or W11, W12, . . . . The reference AD means address part. This part contains the address of, for example, a transmission station and/or a receive station, or in the case of a disk memory, the address of a track or spiral turn. In the latter case AD usually also contains a further indication for the part of the track (sector) where the relevant block is situated. CM means command part in which given commands (for example, inhibition of writing over already present data) may be present.

Figure 2:
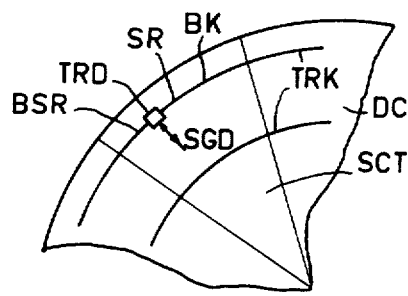
FIG. 2 shows a part of a storage disk with a signal sequence.

FIG. 2 diagrammatically shows, by way of example, the set-up in the case of a disk memory. DC is a disk of a magnetic or optical recording material. A sequence SR is situated in a sector SCT on a track TRK. TRD is a transducer device situated at the area of the track TRK. In addition to being concentric as shown, the track may also be a part (or turn) of a spiral track. The transducer TRD may be a magnetic head or an optical transducer. The terminal SGD serves for connection to the remainder of the system (see FIG. 4). Magnetic disk memories are generally known, so they will not be elaborated herein. The same is applicable to optical memories. In this respect, reference is made, by way of example, to a system of an optical memory as described in U.S. Pat. No. 3,891,794. With respect to this U.S. patent, it is to be noted that therein a synchronization pattern is described which by no means satisfies the accuracy requirement imposed on the system in accordance with the invention: the synchronization pattern according to this known system comprises only one code group which is examined for errors. There is definitely not a plurality of code groups which are tested as regards a majority decision criterion.

Figure 3:
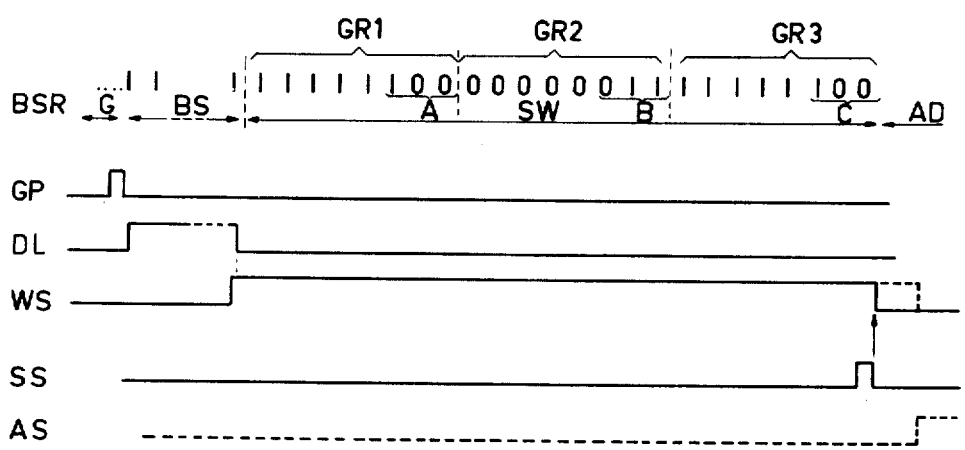
FIG. 3 shows a time diagram.

FIG. 3 shows a time diagram with some signals along a time axis t. BSR is elaborated therein. This figure shows, by way of example, the recognition part G, for example, a specific character which is only used for this purpose. The bit synchronization part BS comprises a series of 1 bit signals. The synchronization pattern SW has the code 11111100 ┆ 00000011 ┆ 11111100 shown. There are $2N+1=3$ groups GR1, GR2 and GR3 with $n=3$, $M=5$, so $m+n=8$ bits. The choice of $m+n$ ($=8$) has already been discussed in the preamble. A number of details concerning the content (and code) of SW will be described hereinafter.

The $n=3$ bits of each group for producing the synchronization signal (SS) are denoted by the codes A, B and C, respectively. GP is the signal which indicates that a new signal sequence commences. GP is generated as soon as the G in the binary signal sequence is detected in the signal processing part of the system (see FIG. 4). DL indicates a delay which starts after the pulse GP and which ceases just before (at a distance of approximately one byte) the start of the synchronization pattern SW. WS is a pulse (window) which appears after termination of DL. This pulse (window) serves to indicate that the passing of the synchronization pattern is to be monitored in the system. During WS, the synchronization signal SS must be formed by a majority decision on the basis of the content of said codes A, B, C. If SS does not appear, WS automatically disappears briefly after the synchronization pattern SW: AS appears. As is shown in FIG. 3, the code parts, A, B and C partly deviate: two parts are equal and have a given Hamming distance (in this case 2 bits) with respect to the third part. A deviation of this kind is important (in addition to what will be described hereinafter) in view of the majority decision to be taken. This is because if the codes A, B and C of these groups were to have the same code content, $2N+1$ ($=3$) different situations would arise when the codes are serially applied to a (shift) register, where $N+1$ ($=2$) out of $2N+1$ ($=3$) the same codes are presented to a majority device connected to the register. Thus, a synchronization signal can appear at $2N+1$ ($=3$) different instants. In order to eliminate this problem, a pulse WS which is accurately defined in time would have to be present as a window pulse. Using this accurately defined window pulse, the synchronization signal should appear at the instant at which the complete synchronization pattern is present in the (shift) register and its branches to the majority device (see also FIG. 4).

As appears from FIG. 3, the number of $N+1=2$ groups, i.e. GR1 and GR3, have the same code content, whilst the number of $N=1$ groups, i.e. GR2, has the same but inverted code content. This selected code pattern and the fact that groups of $m+n$ bits, in in this case GR1 and GR3, alternate with a group having an inverted code content, in this case GR2, and the further choice of $n(=3)$, are based on the effect of the errors most frequently occurring in the medium: bursts, deformations (dropouts) and the like. Notably the choice of $n=3$ bits per code part A, B and C of the code groups is based on probability calculations for synchronization errors: for a bit error rate $\epsilon$, the risk that no synchronization signal occurs at the correct instant (based on the occurrence of random errors) is: $P(N) \approx 3\ (n\epsilon)^2$ ($\epsilon >> 1$). The risk P(F) that an incorrect synchronization signal appears before the correct synchronization signal is dependent on the Hamming distance between the code content of the groups (the Hamming distance is the extent of deviation of the codes from each other. The largest distance, obviously, is determined by the inverse values). Said risk P(F) is further reduced by the use of the pulse WS which commences approximately one byte (8 bits) before the first group of the synchronization word. P(F) is proportional to $\epsilon^{N+1}$. Thus, in this example it is proportional to $\epsilon^2$. The proportionality factor is determined by the number of permutations in the code parts A, B and C which give rise to an error. In the case of three code groups, this number is also three. Therefore, $P(F)=3^2$. Because an incorrect synchronization signal has more serious effects on the system (see above) than the absence of a synchronization signal, the requirement to be satisfied is $P(F)<P(N)$. In order to achieve this, $n>2$ must be chosen. In order to minimize P(N), $n=3$ is chosen. Thus, $P(N) \approx 27\epsilon^2$ and, as has already been stated, $P(F) \approx 3\epsilon^2$, so that requirement is satisfied.

Figure 4:
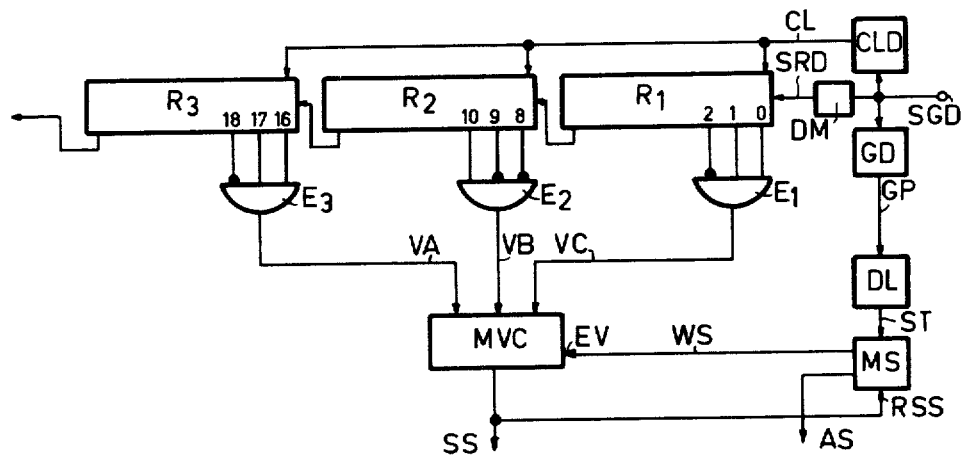
FIG. 4 shows an embodiment of a device for generating the synchronization signal.

FIG. 4 shows an embodiment of a device for generating the synchronization signal. The combination of this device and the example of a medium shown in FIG. 2 forms an example of a system in accordance with the invention. A signal sequence SR read from the medium by said transducer TRD is presented to the device of FIG. 4 via terminal SGD (see FIG. 2). In a clock detector GLD, the bit synchronization is realized to form a clock signal CL. This is a generally applied and known technique. In a detector GD, the starting pulse GP (gap) of a signal sequence is derived from the signal applied via terminal SGD. In a delay circuit DL, the delay pulse DL (FIG. 3) is then formed. Disappearance of this pulse activates a monostable multivibrator in a device MS, via an input ST thereof. The pulse WS (FIG. 3) thus appears. WS is applied to an input EV of a majority decision which is denoted by the reference MVC. MVC is thus prepared to make a majority decision. Following a demodulator DM, the signal sequence SR is applied as a signal sequence SRD to a series of in this case three (2N+1=3) shift registers R1, R2 and R3. Obviously, R1, R2, R3 may also form a single shift register of sufficient length (in this case with m+n=8, so 3×8=24 bits). The signal sequence SR, notably the binary part BSR, passes through the shift registers R1, R2 and R3. The outputs 0, 1, 2 of R1, the outputs 8, 9, 10 of R2 and the outputs 16, 17, 18 of R3 are connected to the AND-function gates E1, E2 and E3, respectively. A dot at an input of such a gate indicates an input inverter. The outputs VA, VB and VC of E3, E2 and E1 are connected to the device MVC. The output SS of MVC supplies the required synchronization signal.

The codes A, B and C of the code groups GR1, GR2 and GR3 arriving in the registers R3, R2 and R1 supply (some bits after inversion) signals to the gates E3, E2 and E1. If the code A is 100, E3 supplies a signal on VA etc. At least $N+1=2$ of the $2N=9=3$ codes A, B and C have to supply a signal on VA, VB and VC in order to make the majority device MVC produce a synchronization signal SS. This is possible only if MVC is enabled on input EV as described above. This means that only the environment of the synchronization pattern SW is tested for the occurrence of the codes A, B and C for evaluation of majority in MVC. It is only in the situation where the synchronization pattern SW is completely present in the registers R3, R2, R1 that the condition can occur where at least two of the three codes A, B and C are correct, so that the synchronization signal can be produced. The object of the invention is thus fully achieved. If no synchronization signal appears within the duration of the pulse WS, the monostable multivibrator in the device MS is deactivated briefly after the synchronization pattern SW, thus supplying a pulse AS. This pulse serves as an alarm for the remainder of the system to indicate that no synchronization signal has appeared. Thus, steps can be taken in the further system. For example, an indication can be given that the relevant sector cannot be used or that reading must be repeated, etc. If a write operation were to take place in such a sector, such an operation is inhibited by AS. This is done to prevent the writing over of data which may not be erased. Because these aspects per se do not further relate to the substance of the invention, they will not be elaborated herein. It is to be noted that the synchronization signal SS, if it occurs on the output of MVC, provides the block/word synchronisation further in the system and also provides resetting of the device MS to the rest position via the input RSS. Because this takes place before the actual expiration of the pulse duration of MS (which causes the appearance of the pulse AS), obviously no pulse AS occurs.

Figure 5:
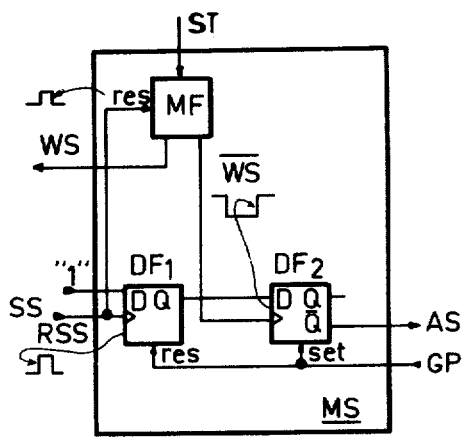
FIG. 5 shows a detail of the device shown in FIG. 4.

FIG. 5, being a further detail of FIG. 4, shows the procedure in the device MS. The reference MF in FIG. 5 denotes a monostable multivibrator in the device MS. DF1 and DF2 are D-flipflops. Assume that the D-input of DF1 carries a "1" signal which is supplied, for example, from a point having a constant potential. The pulse GP resets DF1 via input "rest". GP sets the flipflop DF2 via input "set". Thus, the output Q of DF1 carries a "0"-signal and Q of DF2 carries a "1"-signal. The monostable flipflop switches over in reaction to ST and supplies WS. If SS occurs, the leading edge thereof transfers the "1" on the Q output of DF1 to input D of DF2. In reaction to the trailing edge of SS, the monostable flipflop MF is reset via the reset input of MF. The trailing edge of WS then ensures that this "1" on D of DF2 is transferred to Q of DF2. On Q there already was a "1", so nothing changes. However, if SS fails to appear, the following takes place: the Q output of DF1 still carries a "0" signal which is present on the D input of DF2. When the trailing edge WS appears after the maximum duration of WS, said "0" signal is applied to the Q output of DF2. The $\overline{Q}$ output thus becomes "1", which means that AS appears. AS remains present during the relevant signal sequence. The initial situation is restored only in reaction to the next GP pulse (of a next signal sequence). It is to be noted that MF, obviously, may also be a counting device which counts down a period equal to the length of WS.

Figure 6:
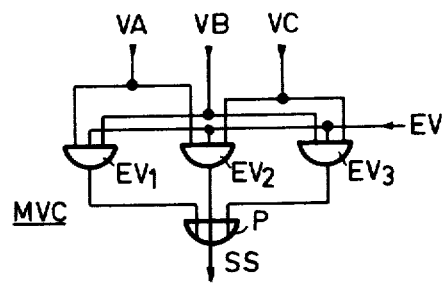
FIG. 6 shows an embodiment of a majority device.

Furthermore, FIG. 6 shows a feasible construction of a majority decision device MVC. This device comprises three AND-function gates EV1, EV2 and EV3 which said signals VA, VB and VC are applied two-by-two. The gates EV1, EV2 and EV3 are enabled during the (window) pulse WS via EV. Outputs of these gates are connected to an OR-function gate P. The synchronization signal appears on SS if at least two of the three input signals VA, VB and VC (in the form of a 1-bit signal) occur.

What is claimed is:

1. A system incorporating a medium which presents signal sequences which consist at least partly of binary signal sequences, and a device for generating a synchronization signal for synchronizing at least parts of said signal sequences (words, blocks), wherein a binary signal sequence contains a synchronization pattern which consists of (2N+1) groups of codes, each with a number of n (n>2) bits, a number of (at the most N+1) groups having a code content which has at least a given minimum Hamming distance with respect to the code (codes) of the other group (groups), said device constituting a majority decision device which produces the synchronization signal by means of said codes on the basis of a majority decision (N+1 out of 2N+1), characterized in that:

a number of m (m>0) bits is added to the codes of n bits in the (2N+1) groups, the groups having a code length m+n such that there is only an acceptably small risk that a disturbance (burst) occurring or present in the medium extends over a length which exceeds the length of m+n bits;

the number (at the most N+1) of groups consisting of m+n bits having a code content which has a given at least minimum Hamming distance with respect to the code (codes) of the other group (groups); and only the n bits of each group still being used for producing the synchronization signal.

2. A system as claimed in claim 1, characterized in that there are provided further means for generating a pulse (window) which commences at a given distance from a recognition point of the binary signal sequence and which is maintained for a period of time during which a synchronization signal can arise from the synchronization pattern, the pulse (window) being terminated by the occurrence of the synchronization signal.

3. A system as claimed in claim 1 or 2, characterized in that said codes of n bits which are situated at predetermined locations in the groups of m+n bits are applied, per code of n bits and given bits thereof after inversion, to n inputs of an AND-function unit, the outputs of the (2N+1) AND-function units being connected to inputs of the majority decision device and the synchronization signal appearing on the output of the majority decision device in response to a majority decision.

4. A system as claimed in claim 2, characterized in that the recognition point of the binary signal sequence can be detected as a unique signal (gap) from this sequence at the start of the signal sequence.

5. A system as claimed in claim 1, characterized in that a group of m+n bits having a given code content alternates with a group of m+n bits which has at least a given minimum Hamming distance with respect to the former group.

6. A system as claimed in claim 1 or 5, characterized in that the number of (at the most N+1) groups consisting of m+n bits have the same code content, whilst one or more (N) groups consisting of m+n bits have the same but inverted code content with respect to the other groups.

7. A system as claimed in claim 1 or 5, characterized in that the m bits added to the codes of n bits in (N+1) groups all have the same (1) value, or these bits all having the same but inverted (0) value in the (N) group (groups).

8. A system as claimed in claims 1 or 2, characterized in that the medium is in the form of a record carrier for the storage of said signal sequences in a memory system.

9. A system as claimed in claim 8, characterized in that the memory system is of the optical type where the data can be written on and read from a record carrier by optical means.

10. A record carrier for use as a storage medium in the system claimed in claim 8, characterized in that the storage medium is a disk-shaped storage plate which is divided into sectors and on which the signal sequences are present in the form of tracks, the tracks being divided in sectors and containing an introductory part (heading) per sector which inter alia contains the synchronization pattern.

11. A record carrier as claimed in claim 10, characterized in that in the synchronization pattern 2N+1=3 groups of m+n bits are present.

12. A record carrier as claimed in claim 10, characterized in that in the synchronization pattern n=3.

13. A record carrier as claimed in claims 11 and 12, characterized in that the synchronization pattern is: 11111100 ┆ 00000011 ┆ 11111100 or the inverse thereof, the code groups of n=3 bits therein being 100, 011 and 100 or the inverse thereof.

* * * * *